COVER FOR DECANTER OR LIKE LIQUID DISPENSING CONTAINER

Original Filed Oct. 14, 1971 3 Sheets-Sheet 1

COVER FOR DECANTER OR LIKE LIQUID DISPENSING CONTAINER

Original Filed Oct. 14, 1971 3 Sheets-Sheet 2

COVER FOR DECANTER OR LIKE LIQUID DISPENSING CONTAINER

Original Filed Oct. 14, 1971 3 Sheets-Sheet 3

United States Patent Office

Re. 28,272
Reissued Dec. 10, 1974

28,272
COVER FOR DECANTER OR THE LIKE LIQUID DISPENSING CONTAINER

Melvin Alpern, 9800 McKnight Road,
Pittsburgh, Pa. 15237

Original No. 3,739,957, dated June 19, 1973, Ser. No. 189,454, Oct. 14, 1971. Application for reissue Feb. 4, 1974, Ser. No. 439,012
Int. Cl. B67d *3/00*
U.S. Cl. 222—556 25 Claims

Matter enclosed in heavy brackets [ ] appears in the original patent but forms no part of this reissue specification; matter printed in italics indicates the additions made by reissue.

ABSTRACT OF THE DISCLOSURE

Removable cap, having a pouring spout thereon, fits snugly over straight-necked decanters or like fluid dispensing containers, has integral skirt, extended to serve as unobtrusive handle to be gripped in the hand of user for pouring purposes without direct contact with neck of container. Skirt has integral inner lip forming peripheral recess for yielding reception of top edge of container neck, thereby to hold cap in place for such pouring, by operation of closure means normally closing spout opening. Closure means has no springs or other bulky protruding parts, and, it is operable by finger pressure of the hand used for gripping skirt to support container for said pouring purposes.

BACKGROUND OF THE INVENTION

While there are numerous prior patents which show pouring spout caps for containers, the best known prior art on the subject fails to disclose the spout cap of the present invention.

Pierrio et al., U.S. Pat. No. 3,212,686, as a typical example, discloses a plastic, screw-top closure cap having a pouring spout and a large integral handle on the same, and a hinged closure strip for the pouring spout. The closure strip, however, is opened by having a long protruding, integral lever for manipulation thereof, and also requires provision of an elongated, integral attaching lug which is snapped into spaced edges on the cap portions, whereby in use of the device the closure strip is subject to breakage at the pivot point of the same.

The *handle free* decanter caps of the present invention, on the on the other hand, have top portions *or covers* which are substantially free of protrusions, other than small buttons on *cover plates* which are mainly indications of where to press down *behind an axis of movement to lift the front part from a spout closing position. In a preferred embodiment plastic closure plates are pivoted to caps on spaced axes of movement, one axis being at the rear of the closure plate and the other axis being at an intermediate position behind the free front part that closes the pouring spout with the button on a resilient portion between the axes indicating where to press down* on the [resilient plastic] closure plates, for bending the same, yieldingly to elevate free ends of the plates normally closing the mouths of the pouring spouts. In other words, there are no protruding parts on the container cap of the present invention such as handles, levers, spring-actuated mechanisms and/or housings for the same, and there are no metal or other sliding closure parts to be gummed up by the dispensed liquids.

SUMMARY OF INVENTION

The present invention relates to an improved, easy to operate pouring spout cap, as for *containers such as* decanters having elongated tubular necks, and which are relatively inexpensive to produce by known plastic molding methods. The caps may be of molded plastic [to have] *having* an elongated tubular skirt [and] *or side wall having spaced lower and upper ends including a lower portion extending downwardly from an intermediate level to said lower end adapted to fit over a neck of such container and an upper portion extending upwardly from said intermediate level to the upper end. The lower portion has means to make fluid tight engagement with such neck, e.g., an annular wall extending inwardly from an integral with the side wall at said intermediate level and then downwardly to form an annular groove into which the upper part of the neck can be inserted. The cap includes a transverse wall to close it against egress of liquid from within a container to which it is attached except through an opening leading to a pouring spout that preferably diverges upwardly and outwardly from about said intermediate level and which is sometimes referred to as* an upwardly presented closure wall provided [wijh] *with* an opening therein for connecting with a pouring spout protruding radially of the skirt. The skirt is constructed and proportioned for relatively tight application, *i.e., there is at most an annular air space of short radial length between the neck and the side wall,* over a substantial extent of the neck of the container until the upper end of the neck is yieldingly received in [an] *said* annular groove [, defined by an integral lip extending inwardly of the skirt, to form a fluid seal therewith]. The skirt *is long enough to be grasped between the thumb and at least one finger of one hand of a person desiring to pour liquid from a container on which the cap is removably affixed, which is referred to sometimes as "grasping length", so that the handle free tubular wall itself* serves as a protective handle for the container, without having protuberances of the character described.

A closure device for the opening in the pouring spout *is the front portion if a cover mounted on the upper portion of the cap adjacent to the upper end for movement around an intermediate axis behind the pouring spout. The front portion is adapted for swinging movement from a first or lowered position closing the spout to a second or raised position opening it. At the rear of the intermediate axis is a rear portion of the cover that can be depressed within the side wall to swing the front portion upwardly from closed to open position. Resilient means bias or yieldingly urge the front portion to the lowered or closed position. A preferred embodiment of the closure device* may include an elongated closure *or valvular* plate of thin, semi-hard, but somewhat flexible plastic material of well known types, seated in a recess formed or molded in the top wall. The closure plate may have aligned pins or steam at the *rear* end of the same opposite from the spout, which have been snapped into transversely undercut aligned pivot recesses in the top wall at opposite sides of a plate, and within which recesses the plate is complementally received to pivot as necessary. Intermediate the spout opening and said aligned pivot recesses, the top wall similarly may have a pair of transversely elongated notches provided therein to define laterally undercut, transversely extending guide edges, under which another pair of laterally aligned, integral stems are snapped to hold the closure plate locked flatwise in the plane of the top wall. The top wall also may have formed therein a shallow chamber which is normally closed by the elongated strip overlying the same.

By yieldingly despressing the flexible strip into said shallow chamber, to an extent determined by the movement of the pivot pins in the aforesaid elongated notches, the forward free end of the strip is [flexed] *tilted* upwardly. This operation is accomplished by pressing the index finger of one hand against the strip *between the rear and intermediate pivot pins* while grasping the cap sleeve in the same hand, as for pouring fluid from the spout of the decanter.

A general object of the invention is to provide an improved cap, as for fluid containers of the character described, utilizing inexpensive parts, and which includes novel manually operable valving means for a pouring spout on said cap which does not require provision of bulky mechanism and/or a protruding handle.

Other objects of the invention will be manifest from the following brief description and the accompanying drawings:

Figure 3:
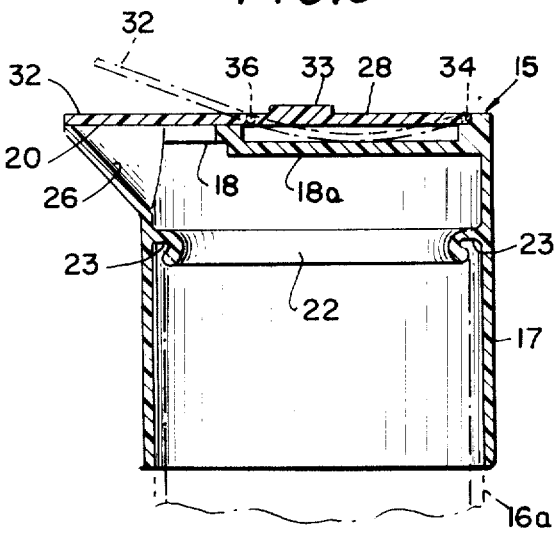
FIG. 3 is a vertical cross-section through the cap, taken substantially on the line 3—3 of FIG. [1,] *2,* and on the same scale.
Figure 4:
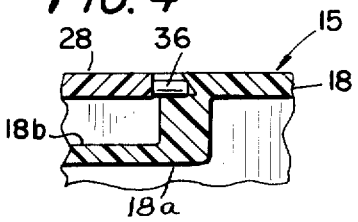
FIG. 4 is a fragmentary vertical cross-section, taken substantially on the line 4—4 of FIG. 2, on a larger scale, to illustrate a relatively [fixed, but] *movable and* selectively releasable, hinge pin connection between the valvular plate and the cap.

Referring to FIGS. 1 to 6, of the drawings, there is illustrated a cup-shaped *dispensing* cap 15 for removably fitting over a tubular neck 16a of a glass or like decanter 16. The cap 15 may comprise a molded axially elongated tubular skirt *or side wall* 17, of hard or semi-hard plastic material, *having an upper end partially closed by* an integral top closure wall 18, and an integrally *upwardly and outwardly diverging* pouring spout 19 which protrudes radially of the skirt 17 to have an upper edge in a plane generally paralled with *but slightly lower than the upper side of* the closure wall 18, and serving as a valving seat 20. The skirt 17 is of sufficient axial length *from said upper end to an open lower end* to be gripped *as between the thumb and at least one finger,* in one hand, and thereby serve as an insulating handle for the decanter. *In other words, the side wall 17 is of grasping length and handle free because no protruding handle is necessary for use of the dispensig cap to pour hot liquid from a container filled therewith to which the cap has been removably affixed. The means for removably affixing the cap to the straight neck of 16a of a container 16 may have any suitable structure but in a preferred embodiment of the invention an* [An] annular lip 22 may be integrally molded on the inner surface of the skirt *at an intermediate level between said upper and lower ends of the side wall 17. As seen best in FIGS. 1, 3 and 7 the lip 22 includes inwardly and downwardly extending portions* [, adjacent closure wall 18] to define an annular groove 23 between the lip and said inner wall surface, for tight fluid-sealing reception of the upper edge of the decanter neck in the groove, against the yielding resiliency of the lip. The space between the lip 22 and closure wall 18 serves as a relatively unobstructed chamber, *opening or passageway in the upper portion of the cap* communicating directly with the pouring spout aperture 26. *The pouring spout starts at a point near said intermediate level, e.g., just above the lip 22 as seen in FIG. 3, and diverges radially outwardly from and upwardly along the side wall which terminates at the juncture with the spout to provide said direct communication through the side wall into the spout aperture 26.*

*In general dispensing containers such as decanters include a straight neck which usually is of circular cross section, although other cross sections are possible, if desired. The side wall 17, at least in the lower portion below the lip 22, has substantially the same shape in cross section as the neck of the container with which the dispensing cap is designed to be used so that the lip 22 can make the desired fluid tight connection with the neck. Preferably the side wall has a uniform external cylindrical cross section from its lower end to its upper end except for the pouring spout.*

*The upper end or valving seat 20 of pouring spout 19 is normally closed by a cover mounted on the upper portion of the cap 15 adjacent to its upper end for movement around an intermediate axis behind the pouring spout. The portion of the cover in front of said axis is adapted for swinging or tilting movement around said axis from closed to open position and vice versa.*

Figure 2:
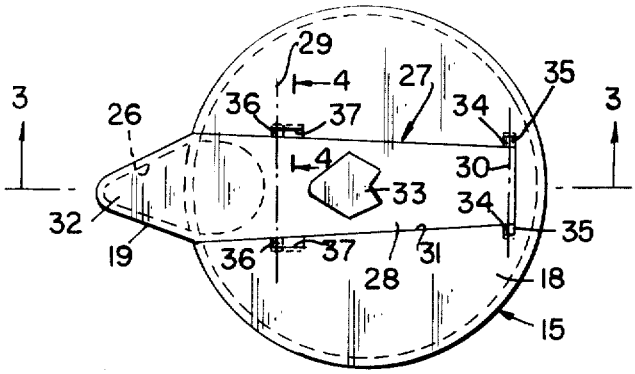
FIG. 2 is a top plan view of the cap shown in FIG. 1, on the same scale, to illustrate a manually operable valvular plate *or cover* for a pouring spout on the cap.
Figure 1:
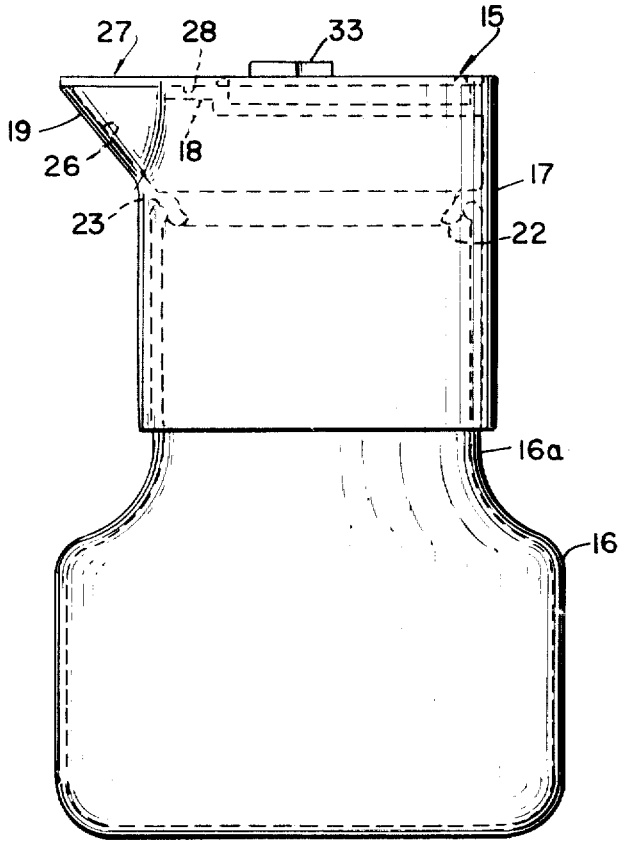
FIG. 1 is a side elevation illustrating one form of improved pouring spout cap of the invention, applied over the tubular neck of a glass or like fluid container or decanter.
Figure 5:
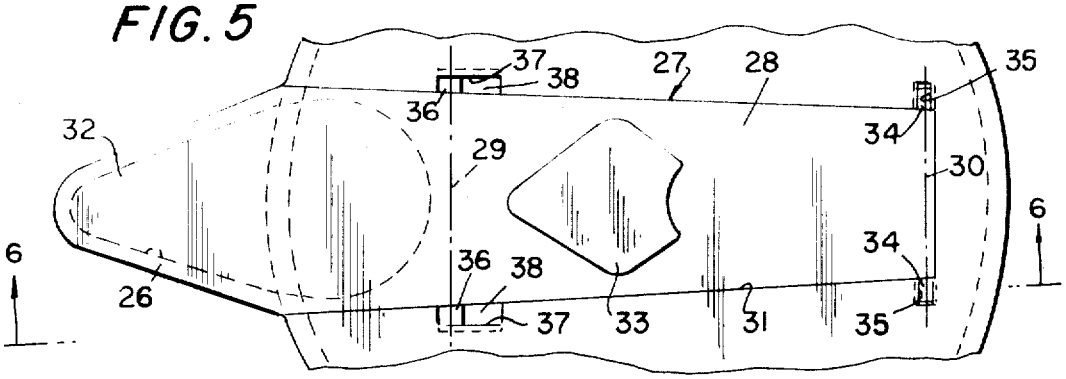
FIG. 5 is a fragmentary top plan view corresponding in part of FIG. 2, but on a larger scale.
Figure 6:
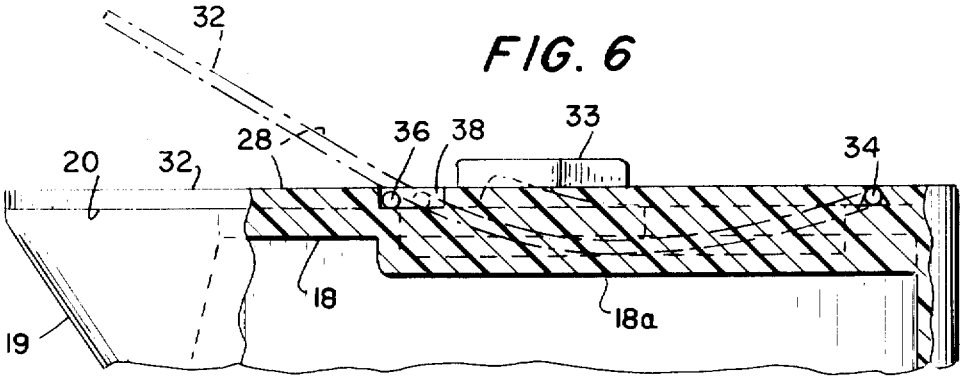
FIG. 6 is a vertical cross-section taken on the line 6—6 of FIG. 5, and on the same scale, to illustrate the manner of releasably mounting the valvular plate for manual operation thereof to open and close the pouring spout.
Figure 7:
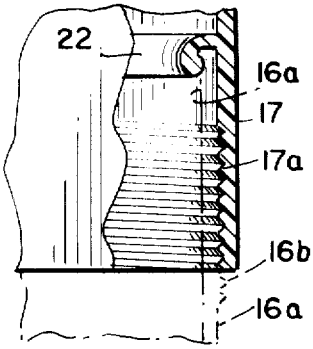
FIG. 7 is a fragmentary cross-section, corresponding to the lower right-hand portion of FIG. 3, but on a larger scale, illustrating provision of an internal screw thread means on the cap skirt for threaded connection of the cap on the neck of a decanter having corresponding thread means.

Referring now to FIGS. 1, 2, 5 and 6 in general and to FIGS. 5 and 6 in particular, there is shown a simple and yet very efficient and economical valvular means 27 for manually opening and closing the spout aperture 26. For this purpose a [thick, elongated,] plate 28 of resilient material, such as molded semi-hard, synthetic elastic plastic, is hingedly mounted on *two* hinge axes at spaced points, *an intermediate axis* 29 and *a rear axis* 30, to be yieldingly supported flatwise and complementally fitted within a plate recess 31 in the closure wall, and [to have an internal] *and has a front portion or* closure extension 32 normally engaging said valving seat 20 for closing the spout aperture 26.

For [manually] *permitting manual* opening and closing *of the spout aperture by* the valvular plate 28, one said hinged mounting may be [provided to have lost-motion effect] *made movable relative to the other* whereby upon manual pressure of a finger against a button 33 on the plate 28, intermediate the spaced hinge axes, the [entire] *portion of the* plate *between the axes* is bowed inwardly [, yielding to move] *moving* the closure extension 32 outwardly of the spout opening 20 for pouring purposes, as shown in chain-dotted lines in FIG. 6. *The resilience of the plate 28 biases the cover to closed position.*

In the form of the inventon as best shown in FIGS. *5* [6] and [7] *6,* the fixed hinge connection is at the right hand *or rear* end of the plate 28 and includes laterally spaced pivot pins 34, 34 which are integral with the plate 28, and which are yieldingly pressed past undercut spaced edges of slots 35, 35 provided in the closure wall 18, at the opposite edges defining the plate-receiving recess 31. The second hinge connection at 29 is [provided with lost-motion hinged action,] *made movable relative to the hinge connection at the rear axis 30* by similar pivot pins 36, 36 which are yieldingly pressed past spaced undercut edge 37, 37 of transversely elongated slots 38 at opposite sides of the plate. By manually depressing a button [32] *33* on the plate, at a point intermediate the spaced hinge axes, resultant movement of the movable pins, in direction toward the fixed hinge point pins, causes the closure plate to be bowed downwardly, thereby to elevate the valving end 32 to open position, as shown in chain-dotted lines in FIG. [5.] *6.*

The top wall 18 may have a depressed wall portion 18a formed thereon, to provide a closed recess 18a into which the valvular plate 28 can be bowed without exposure to fluid being poured from the container. The bottom wall portion 18a may also serve to limit the extent to which the plate 28 can be depressed.

Thus, with the cap 15 affixed on the neck of 16a of the decanter 16, the skirt portion 17 can be grasped in one hand at various points for pouring purposes, because there are no handles or other protruding parts obstructing use of a are finger to press the button 33 for operating the valvular plate 28.

Referring to FIG. [5,] *7*, there is illustrated a modification of the closure cap 17 shown in FIG. 3, in which an internal thread 17a is provided for use on containers *having necks* 16a provided with complementally *externally* threaded portions *16b. This is a second embodiment of means for removably affixing caps to straight necks of containers and it preferably includes an internal lip 22 to provide fluid tight sealing as described above for the other embodiment illustrated in FIG. 3.*

Figure 8:
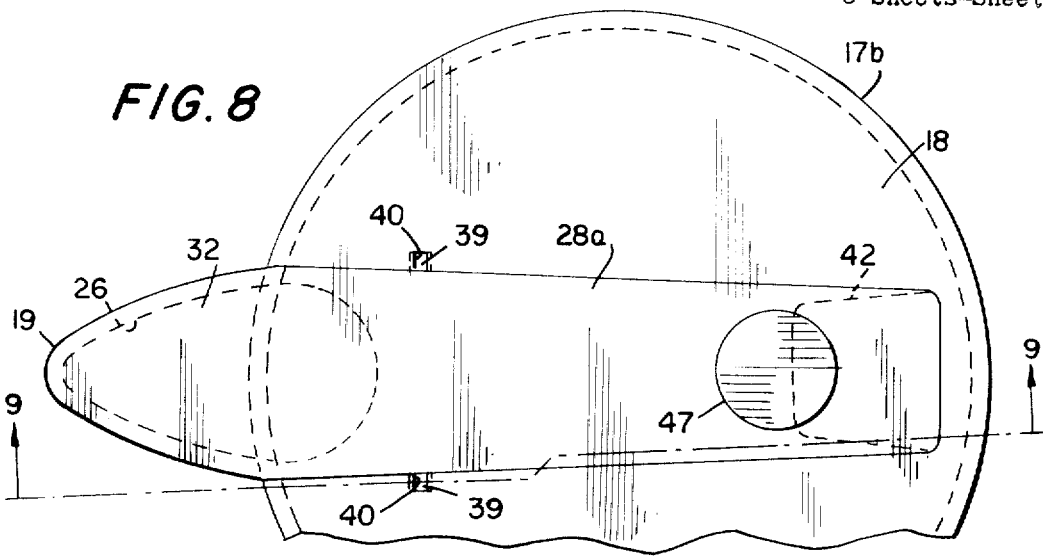
FIG. 8 is a top plan view, corresponding to FIG. 5, on the same scale, and illustrating a modified form of spout valving means for the container cap.
Figure 9:
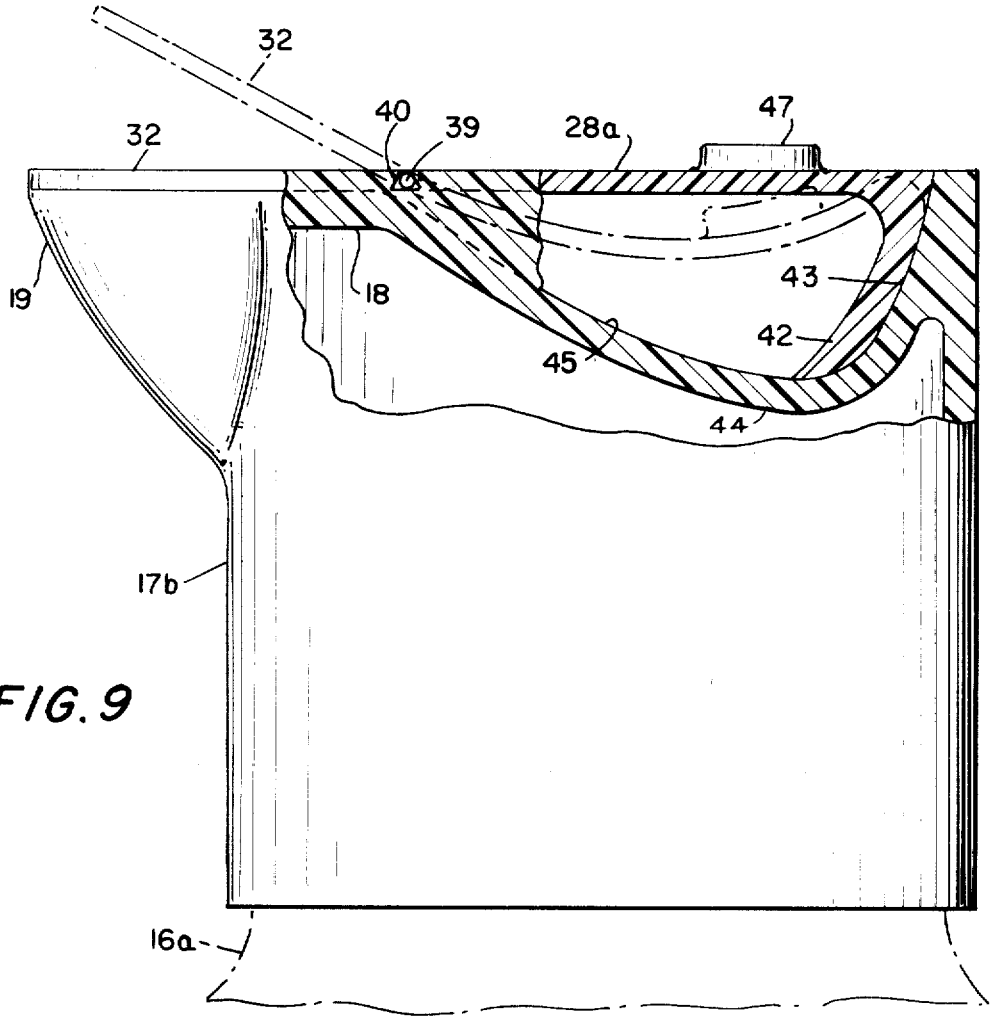
FIG. 9 is a side elevation, partly broken away and in section, in the area as viewed along the line 9—9 of FIG. 8, and also on the same scale as FIG. 8.

Referring now to FIGS. 8 and 9, there is illustrated a modified closure cap [37] *17b* for attachment to a decanter neck 16a generally as shown in FIGS. 1 to 3 and 7. Like parts, therefore, will be designated by like numbers unless otherwise noted. In this instance, however, a thin yieldingly flexible valvular [plage] *plate* [38] *28a* having the same general shape and location as the plate 28 shown in FIG. 5, has axially aligned pivot pins 39, 39 *on an intermediate axis of movement,* releasably received in undercut slots 40, 40 in the top wall 18[*a*] in the manner of the fixed hinge points 35 in FIG. 5. The *rear* end of the plate [38] *28a* opposite the spout end thereof, however, has an integral lug or flange 42, which curves downwardly and inwardly, and nestles snugly in a complementally shaped portion 43 of a wall 44 defining a curvate recess 45 in the top wall 18[*a*] of the closure cup [37.] *17b.*

A suitably positioned button 47 on the closure plate *28a* [38] is manually yieldingly depressible as before, to bow the closure plate inwardly between the relatively fixed, axially aligned, pivot pins 39 and the top of the [lung] *lug* 42 which acts as a movable yieldingly flexible pivotal area, which determines the extent of the downwardly bowing movement of the plate and, therefore, the amount of upward pivotal opening movement of the closure end 32 of the valvular plate, as shown in chain-dotted lines in FIG. 9. In other words, the lug 42, while serving as an anchoring device for holding the valvular plate [38] *28a* in its closed, horizontal position as shown also serves as a resilient anchor or hinge means which determines the degree of spout opening movement of the plate by the amount of bowing movement thereof, as described above. *The combined effect of the resiliency of plate 28a and lug 42 is to bias the front portion 32 into closed position over pouring spout 19. The covers as shown have generally flat upper and lower surfaces, i.e., the major portions of both surfaces lie in spaced, parallel planes. The upper surface of the covers 28 and 28a is preferably in the plane of the upper end of the side wall as seen in FIGS. 3, 4, 6 and 9 while the flat under surface of the front portion 32, in closed position, is in the plane of the valving seat 20 so as to close the spout 19 and the predetermined distance between these planes is the same as the thickness of the front portion 32. The covers 28 and 28a terminate at the rear within the side wall, i.e., do not extend or project beyond the side wall, and when pressure is applied to the buttons 33 and 47 the rear portion behind the intermediate axis of movement is depressed into the space within the side wall. The depressing of the rear portion of the cover in this manner lifts the front portion to open the pouring spout by reason of the movement of the cover around the intermediate axis.*

It should be particularly noted that, as compared with the known related prior art pouring spout caps for decanters, each of the several forms of closure caps of the present invention need only to be composed of two distinct parts, both of which can be economically produced, by plastic molding methods, in multiple cavity molds.

The improved closure caps, moveover, can be easily assembled, with a minimum of labor and other costs, because the valvular plates *forming one distinct part and the cap body forming the other distinct part comprising the skirt or side wall and associated elements* can be quickly snapped together, into the above described hinging connections, ready for immediate attachment to decanters.

Other modifications of the invention may be resorted to without departing from the spirit thereof or the scope of the appended claims.

What is claimed is:

1. A cover, as for a decanter or like liquid dispensing container having a neck portion, comprising: a cap including an annular skirt *having a lower* portion for attachment over the neck portion of the container, an upper closure wall, and a pouring spout extending outwardly from said skirt and having upwardly presented seat means; the closure wall having an opening therein leading to the spout, the closure wall having a depressed portion having a closed bottom and an open top, a valvular plate of flexible material mounted on said cap and closing the open top of the depressed portion, the plate having a valving end normally closing said spout opening, and an opposite end thereof hingedly supported on the cap over the depressed portion; said valvular plate, at a point intermediate said valving end and said opposite end, having a second point of hinged support on the cap, whereby upon application of manual pressure to the plate intermediate said two points of hinged support, said plate is bowed inwardly of said closure wall into the depressed portion to swing said valving end of the plate away from said spout opening for pouring purposes.

2. A [removable] cover as in claim 1, including means adjacent the lower portion of said skirt cooperating with the neck of the container for maintaining [said resilient lip in] *fluid* tight contact [against the upper edge] of the neck of the container[.] *with said skirt.*

3. A cover as defined in claim 1, one said point of hinged support being relatively fixed and the other being relatively movable.

4. A cover as defined in claim 2, wherein said [first point of hinged support is relatively fixed, and said second point of hinged support is relatively movable with opening and closing operation of said valvular plate.] *means includes an internal resilient lip forming a groove with said skirt adapted to receive the upper end of said neck.*

5. A cover as defined in claim 3, wherein said first and second points of hinged support include recess means in said closure wall including undercut retaining edges and pivotal stem means on said valvular plate releasably retained in said recess means by said undercut retaining edges.

6. A cover is defined in claim 1, wherein said [first] *second* point of hinged support is relatively fixed, and [second point of] *the* hinged support *at said opposite end* is relatively movable with opening and closing operation of said valvular plate.

7. A cover as defined in claim 1, said closure wall including inwardly spaced stop means engageable by the manually depressed part of said plate.

8. A cover as defined in claim 1, said valvular plate having thereon an outward protrusion [at said] intermediate [point] *said two points of hinged support* to facilitate application of said manual pressure to open the pouring spout.

9. A cover as defined in claim 1, wherein said *skirt is* [cap includes an axially elongated] tubular [skirt portion,] of [resilient] *molded* plastic material [for removable complemental reception thereof over the neck of the container, an] , *said closure wall is* integral [upwardly presented closure wall, and an] *with said skirt and said pouring spout is* integral [pouring spout opening upwardly of said closure wall;] *with said skirt and opens upwardly;* said skirt having a radially inwardly presented, integral, resilient lip forming an annular groove for yielding fluid-sealing reception of the upper edge of the neck therein; said skirt being of substantial axial extent adapted to be firmly gripped by the fingers of a user of the container for pouring purposes without direct contact of the fingers with the neck of the container.

10. A removable cover as in claim [1,] 9, including means adjacent the lower portion of said skirt cooperating with the neck of the container for maintaining said resilient lip in tight contact against the upper edge of the neck of the container.

*11. A handlefree dispensing cap adapted for use on a decanter or like liquid dispensing container having a straight neck comprising:*

*(a) a tubular side wall of grasping length having spaced lower and upper ends including:*

*(1) a lower portion extending downwardly from an intermediate level to said lower end adapted to fit over a neck of such container and having means to make fluid tight engagement therewith, and*

*(2) an upper portion extending upwardly from said intermediate level to said upper end having an upwardly opening pouring spout;*

*(b) a cover mounted on the upper portion of said cap adjacent to said upper end for movement around an intermediate axis behind said pouring spout and having:*

*(1) a portion in front of said axis adapted for swinging movement from one position closing said pouring spout to a second position opening it, and*

*(2) a portion at the rear of said axis that can be depressed within said side wall to swing the front portion upwardly from closed position to open position; and*

*(c) means resiliently biasing said cover to closed position.*

*12. A handle free dispensing cap as set forth in Claim 11 in which said side wall has the same cross sectional shape as the neck and the lower portion is threaded internally to engage a corresponding outwardly threaded neck of such container.*

*13. A handle free dispensing cap as set forth in Claim 11 in which said means to make fluid tight engagement is a resilient lip which extends inwardly from the side wall at said intermediate level and then downwardly forming a groove in which said neck is adapted to be held by said lip.*

*14. A handle free dispensing cap as set forth in Claim 13 in which said side wall has the same cross sectional shape as the neck of such container and said pouring spout diverges upwardly and outwardly from said intermediate level.*

*15. A handle free dispensing cap as set forth in Claim 11 in which said cover is mounted for movement also around a second axis at the end of the portion at the rear of said intermediate axis and the cover between said axes can be flexed.*

*16. A handle free dispensing cap as set forth in Claim 15 in which the upper end of said side wall has a top wall provided with an elongated recess extending from the pouring spout substantially across the top wall and the cover fits in said recess.*

*17. A handle free dispensing cap as set forth in Claim 16 in which said cover has pivot pins extending outwardly at said intermediate axis into slots in said top wall and means providing for transverse motion of at least one of said axes toward the other when the cover between them is flexed.*

*18. A handle free dispensing cap as set forth in Claim 17 in which said transverse motion means comprises elongated slots for the pivot pins at said intermediate axis and said cover has pivot pins extending outwardly at said rear axis into close fitting slots in said top wall.*

*19. A handle free dispensing cap as set forth in Claim 16 in which said transverse motion means comprises close fitting slots for the pivot pins at said intermediate axis and said cover has an integral downwardly extending lug at the rear end fitted into the recess in said top wall.*

*20. A handle free two piece dispensing cap adapted for use on a container having a neck of circular cross section comprising:*

*(A) a one piece molded plastic body adapted to be removably affixed to a neck of such container comprising a side wall of grasping length having:*

*(1) a lower cylindrical portion large enough in cross section to fit over the neck of such container with at most an annular air space of short radial length between said wall and neck,*

*(2) an upper portion including:*

*(a) a pouring spout diverging upwardly and outwardly from a lower point to an upper end, and*

*(b) an upward extension of said lower cylindrical wall portion connecting with the pouring spout and terminating in a plane above the upper end of said pouring spout; and*

*(3) means adapted to make fluid tight engagement of said lower cylindrical portion with said neck comprising a wall extending inwardly from the upper part of said lower cylindrical portion and a wall extending downwardly from said inwardly extending wall forming a groove with said side wall to receive and removably hold the end of said neck;*

*(B) a one piece molded plastic cover pivotally mounted at an intermediate position on said cap behind said pouring spout, said cover having a front pouring spout closing portion and a rear portion depressible into the space within said side wall to lift said spout closing portion, and said cover having a generally flat upper surface lying, in closed position, in said plane; and*

*(C) means biasing said cover to closed position against the upper end of said pouring spout.*

*21. A handle free two piece dispensing cap as set forth in Claim 20 in which said upper portion includes an integral closure wall having a cover receiving recess extending rearwardly from said pouring spout and the pivotal mounting of the cover to said closure wall includes hinge pins and slots.*

*22. A handle free two piece dispensing cap as set forth in Claim 21 in which said cover is also pivotally mounted to said closure wall at the end opposite said spout closing portion and the rear portion of the cover between said intermediate and rear pivotal mountings can be flexed.*

*23. A handle free dispensing cap adapted for use on a container having a neck comprising:*

*(a) a side wall of grasping length having upper and lower ends and a pouring spout in the upper portion,*

*(1) said side wall, except for the pouring spout, having the same cross sectional shape as, but larger than, the neck of such container over which it is adapted to fit with at most a relatively small air space between them,*

*(2) said pouring spout diverging upwardly and outwardly from its lower end to its upper end,*

*(3) the upper end of said side wall terminating in a first plane and the upper end of said pouring spout terminating in a secod plane parallel to but lower than said first plane by a predetermined distance,*

*(b) means integral with said side wall extending inwardly at approximately the level of the lower end of said pouring spout and then downwardly for making fluid tight engagement with said such neck,*

(c) *a cover comprising a front spout closing portion, a rear portion and a pivotal connection with the upper end of said side wall,*

(1) *at least the major portion of the upper and lower surfaces of said cover being plane and, in closed position, having its upper plane surface in the said first plane and its lower plane surface in said second plane and closing said pouring spout,*

(2) *the axis of said pivotal connection being behind the spout at an intermediate position of the cover that permits the rear portion of the cover to be depressed within said side wall to lift the front portion to open the pouring spout, and*

(d) *means to bias the cover resiliently to closed position.*

*24. A handle free two piece dispensing cap as set forth in Claim 23 in which the upper end of said side wall includes an integral closure wall having a cover receiving recess extending rearwardly from said pouring spout and the pivotal connection of the cover to said closure wall includes hinge pins and slots.*

*25. A handle free two piece dispensing cap as set forth in Claim 23 in which said cover is also pivotally mounted to said closure wall at the end opposite said spout closing portion and the rear portion of the cover between said intermediate and rear pivotal mountings can be flexed.*

References Cited

The following references, cited by the Examiner, are of record in the patented file of this patent or the original patent.

UNITED STATES PATENTS

| | | | |
|---|---|---|---|
| 3,405,851 | 10/1968 | Barker et al. | 222—517 X |
| 3,165,243 | 1/1965 | Haynes | 222—517 X |
| 1,173,546 | 2/1916 | Baron | 222—472 |
| 569,351 | 10/1896 | Putman | 222—556 |
| 2,120,699 | 6/1938 | Gamble | 222—472 |
| 3,212,686 | 10/1965 | Pierro et al. | 222—556 X |
| 3,168,226 | 2/1965 | Underwood et al. | 222—556 X |

STANLEY H. TOLLBERG, Primary Examiner

N. L. STACK, Jr., Assistant Examiner